Dec. 31, 1957     V. B. STEFFEN     2,818,009
BASE FOR STEEL STORAGE BIN
Filed Aug. 5, 1955
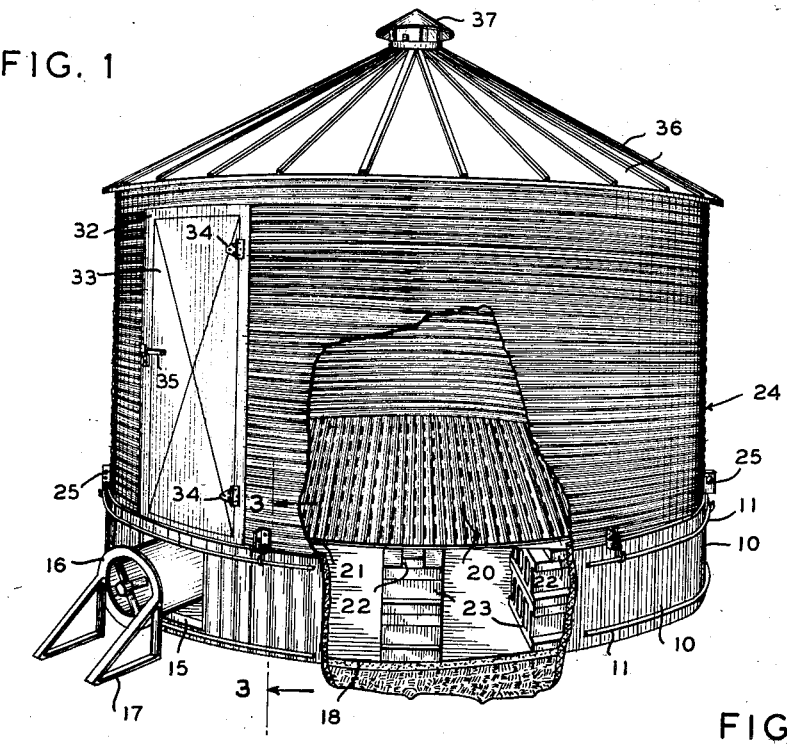
FIG. 1
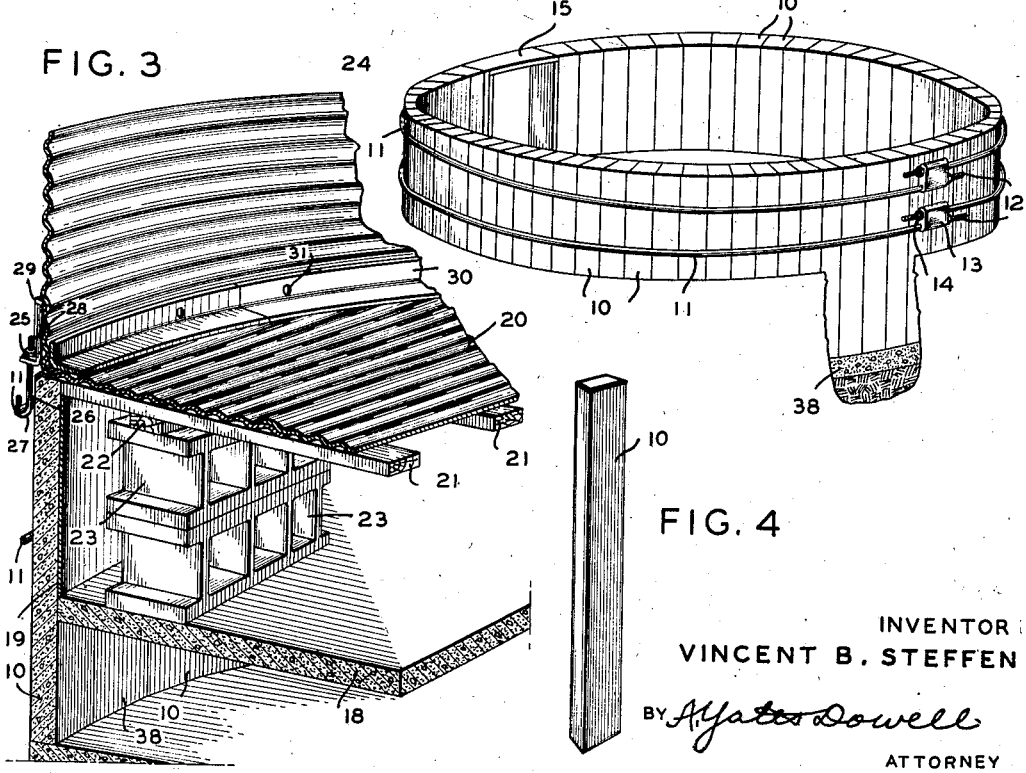
FIG. 2
FIG. 3
FIG. 4
INVENTOR
VINCENT B. STEFFEN
BY A. Yates Dowell
ATTORNEY United States Patent Office 2,818,009
Patented Dec. 31, 1957

2,818,009
BASE FOR STEEL STORAGE BIN
Vincent B. Steffen, New Hampton, Iowa
Application August 5, 1955, Serial No. 526,733
3 Claims. (Cl. 98—55)

This invention relates to the collection and storage of commodities and more particularly to storage bins or enclosures used for holding materials in bulk and including those produced on the farm and having a substantial moisture content.

The invention relates specifically to the construction of a base for a steel bin or enclosure for use in storing grains and other crops immediately upon their being harvested and without the necessity of giving consideration to any excess moisture in the material stored.

It has been customary to cut crops and let them remain in the fields until they were dry enough to be stored without damage due to excess moisture. This procedure was dependent on climatic conditions and bad weather or excess moisture could cause damage to crops. Also, the crops were exposed to animals and insects which likewise could damage while the crop remained in the field unprotected. It was possible for an entire year's labor to be lost due to circumstances beyond the control of the farmer.

Farming methods have changed to such an extent that those depending on the soil for their livelihood are no longer content to take risks if they can be avoided. Consequently the advantage derived from the prompt storage of crops and mechanical drying of the same has been realized and is desirable. Bins and enclosures employed have not been satisfactory for various reasons including the fact that they and particularly their bases or foundations were too complicated and expensive, they could not be easily built and they required a great variety of material and a large amount of labor in their construction, and they were lacking in efficiency.

It is an object of the persent invention to provide a relatively simple and inexpensive storage bin or enclosure in which grain and other farm products can be readily stored as soon as harvested and which can be easily and quickly erected by semi-skilled labor available around the farms.

Another object of the invention is to provide a storage enclosure or bin in which a crop can be immediately stored after harvesting and which, when the moisture content is in excess of 25%, will reduce the moisture content until it is safe for storage.

Another object of the invention is to provide a storage bin having a foundation which can be easily erected without expensive concerete mixing equipment and which when erected will provide an adequate solid foundation and support including under extreme conditions such as during high winds, hurricanes or tornadoes.

Other objects and advantages of the invention will be apparent from the following description taken in conjunction with the accompanying drawing wherein:

Fig. 1 is a perspective of a grain storage enclosure or bin in accordance with the present invention, portions being cut away to reveal internal structural details;

Fig. 2, a perspective of the foundation of the structure, the lower portion of which imbedded, but with the earth removed from a limited area to disclose the lower limits of the foundation;

Fig. 3, a perspective of a section on the line 3—3 of Fig. 2; and,

Fig. 4, a perspective on one of the concrete blocks employed in the foundation of the structure.

Briefly stated, the bin or enclosure of the present invention includes a foundation of footings on which are disposed concrete posts or staves arranged in a circular manner and held together by tension hoops. Within this foundation are provided spaced transverse joists supporting a perforated floor, an upright corrugated metal wall bolted at spaced intervals to the upper of said tension hoops, and a conical or peaked roof having an air vent at its apex. A screw or other type conveyor and a fan or other mechanism are disposed in an opening in the foundation in a manner for removing the contents of the bin and for supplying air beneath the floor so that it may pass up through the contents of the bin for accelerating the drying of the stored grain or other material.

With continued reference to the drawing and particularly Fig. 1, the grain bin or enclosure of the present invention comprises a foundation composed of a series of upright concrete posts or staves 10 arranged in circular fashion and bound together by tension hoops 11 having threaded ends 12 extending through a connector and held in place by nuts 14. The staves may be of wedge shape cross section for snug engagement one with another.

The foundation posts are imbedded for approximately half of their lengths as is shown in Fig. 2. The foundation is continuous except for a frame 15 which forms an opening for the reception of a fan, blower, or air conditioning device 16 and a screw discharge conveyor mounted on triangular frame member 17. Within the foundation is a floor 18 in the form of a slab of concrete poured on the ground in order to exclude moisture which might arise from the ground.

In order to render the floor and the interior of the foundation thereafter airtight, a suitable waterproof coating 19 may be applied. A perforated floor 20 is supported on transverse joists 21 mounted in any desired manner on the foundation, one way of supporting the joists being by the use of joist supporting sills 22 resting upon concrete blocks 23 arranged in any desired manner as, for example, in spaced rows.

A corrugated circular side wall 24 is provided and is held in place by means of angle brackets 25 attached thereto and connected by means of J-shaped anchor bolts 26, hooked ends 27 extending around an upper hoop 11 encirculing the foundation forming posts or staves and the threaded end 28 of the bolts being located in openings in angle brackets 25 and provided with nuts 29 for binding the angle bracket and the sidewall upon the base.

On the interior of the corrugated circular side wall is mounted a segmental retaining ring 30, the horizontal flange of which overlies the edge of the preforated floor 20 and the upright flange of which is disopsed within the inner upright wall 24 and is connected thereto by means of fasteners 31 so that the floor is solidly retained in place. The side wall is provided with a door-frame 32 to which a door 33 is mounted being supported on hinges 34 and provided with a latch 35 to fasten the same in closed position.

A conical top or roof is provided composed of wedge shaped roof plates 36 and with a ventilator 37 at the apex of such roof.

It will be apparent from the above disclosure that a storage bin is provided in which the base is unique in that it permits the farmer to erect the bin on a permanent concrete base without forms and using only a small amount of concrete. The base thus provided will facilitate the drying and conditioning of the grain or other material and serves as a foundation on which can be erected a perforated floor with a wall and roof around and above the same.

It will also be apparent that the base is of concrete staves or slabs on a concrete footing which gives firm support and provides a level place on which to erect the foundation as well as a foundation on which the bin can be permanently anchored. The said staves are in a circle of the desired diameter of the bin and are held in place by hoops properly spaced and which bind the staves into a single unit. The base is provided with an opening beneath the door in which may be attached a drying or conditioning unit as well as an auger, elevated drag, or other device for emptying the bin.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A storage bin comprising a generally cylindrical foundation wall enclosing a supporting surface with the foundation wall extending above the supporting surface, a perforated floor mounted adjacent the top of the foundation wall, stringers extending transversely across said supporting surface and between opposed portions of said foundation wall and supporting said perforated floor at spaced locations to permit air to flow from below the floor up through the floor, hollow supporting blocks positioned on the supporting surface and extending to the transverse stringers for supporting said stringers and the floor thereabove for accommodating heavy loads of grain while permitting air to circulate between the supporting surface and the stringers, means to admit air into the space between said supporting surface and said perforated floor so that the air may percolate through the floor and through the grain, a circular side wall mounted on the top of said foundation wall for maintaining the grain on the floor and permitting the grain to be piled to substantial depth, and means to fix the side walls on the foundation wall.

2. The invention according to claim 1, in which the supporting surface is provided with an impermeable floor and the foundation wall is impermeable whereby air admitted to the space between the supporting surface and the perforated floor must pass outwardly through said perforated floor.

3. A storage bin comprising a generally closed periphery foundation wall enclosing a supporting surface, said foundation wall being formed of a plurality of staves, a side wall mounted on said foundation wall, said side wall having a plurality of downwardly extending hooks overlapping the foundation wall and having the hooks extending outwardly and upwardly, a band positioned in said hooks and surrounding said foundation wall, means to tighten said band thereby securing said hooks to said foundation and maintaining the side wall in fixed position on said foundation, a perforated floor positioned adjacent the top of the foundation wall, hollow structural elements mounted on the supporting surface enclosed by the foundation wall to support said perforated floor while permitting air to flow freely between said perforated floor and the supporting surface, and means for admitting air under pressure into said space for drying grain in said storage bin and ventilating means at the top of said storage bin to permit the air to pass outwardly of said bin.

References Cited in the file of this patent
UNITED STATES PATENTS

| | | |
|---|---|---|
| 1,260,024 | Parton | Mar. 19, 1918 |
| 1,339,437 | Dickelman | May 11, 1920 |
| 1,542,721 | Piening et al. | June 16, 1925 |
| 1,834,842 | Houghtaling | Dec. 1, 1931 |
| 2,074,592 | Rowell | Mar. 23, 1937 |
| 2,504,213 | Meyer | Apr. 18, 1950 |
| 2,593,424 | Edgerly | Apr. 22, 1952 |
| 2,711,308 | Cogan | June 21, 1955 |